June 1, 1954

R. D. THOMPSON 2,680,195

ELECTRONIC SWITCHING CIRCUIT

Filed July 25, 1952

2 Sheets-Sheet 1

INVENTOR.
ROGER D. THOMPSON

BY Darby & Darby

ATTORNEYS

June 1, 1954

R. D. THOMPSON

ELECTRONIC SWITCHING CIRCUIT 2,680,195

Filed July 25, 1952

2 Sheets-Sheet 2

INVENTOR.
ROGER D. THOMPSON
BY Darby & Darby
ATTORNEYS

Patented June 1, 1954

2,680,195

UNITED STATES PATENT OFFICE 2,680,195

ELECTRONIC SWITCHING CIRCUIT

Roger D. Thompson, Pompton Plains, N. J., assignor to Allen B. Du Mont Laboratories, Inc., Clifton, N. J., a corporation of Delaware Application July 25, 1952, Serial No. 300,913

4 Claims. (Cl. 250—27)

This invention relates to electronic switching circuits of the type used for field sequential color television systems.

A primary object of the invention is to provide an improved electronic switching circuit.

Other objects are to provide a single electronic switch capable of energizing three separate circuits and to provide such a switch having improved internal synchronization so as to maintain the desired switching sequence.

Figure 1:
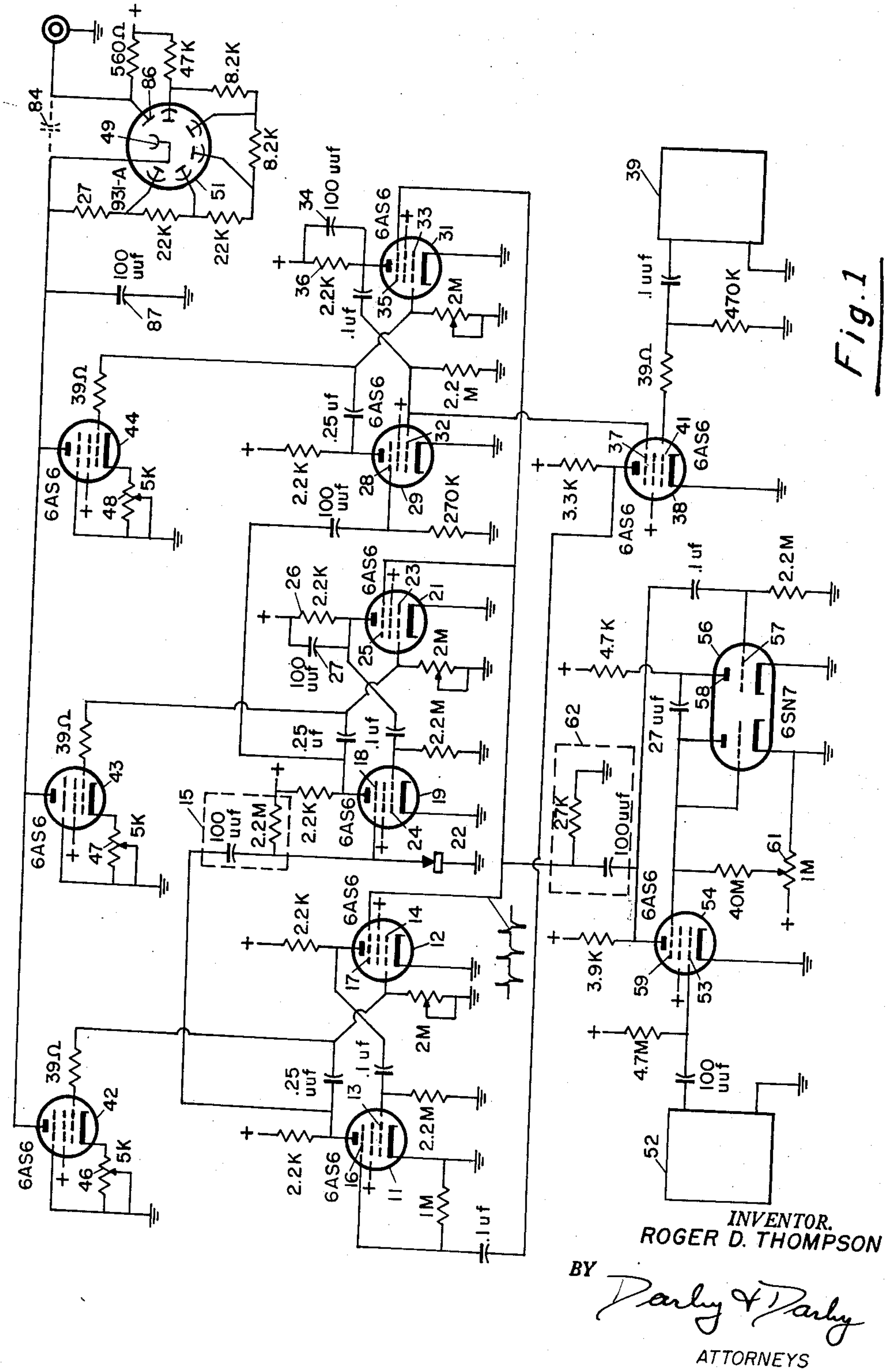
Figure 2:
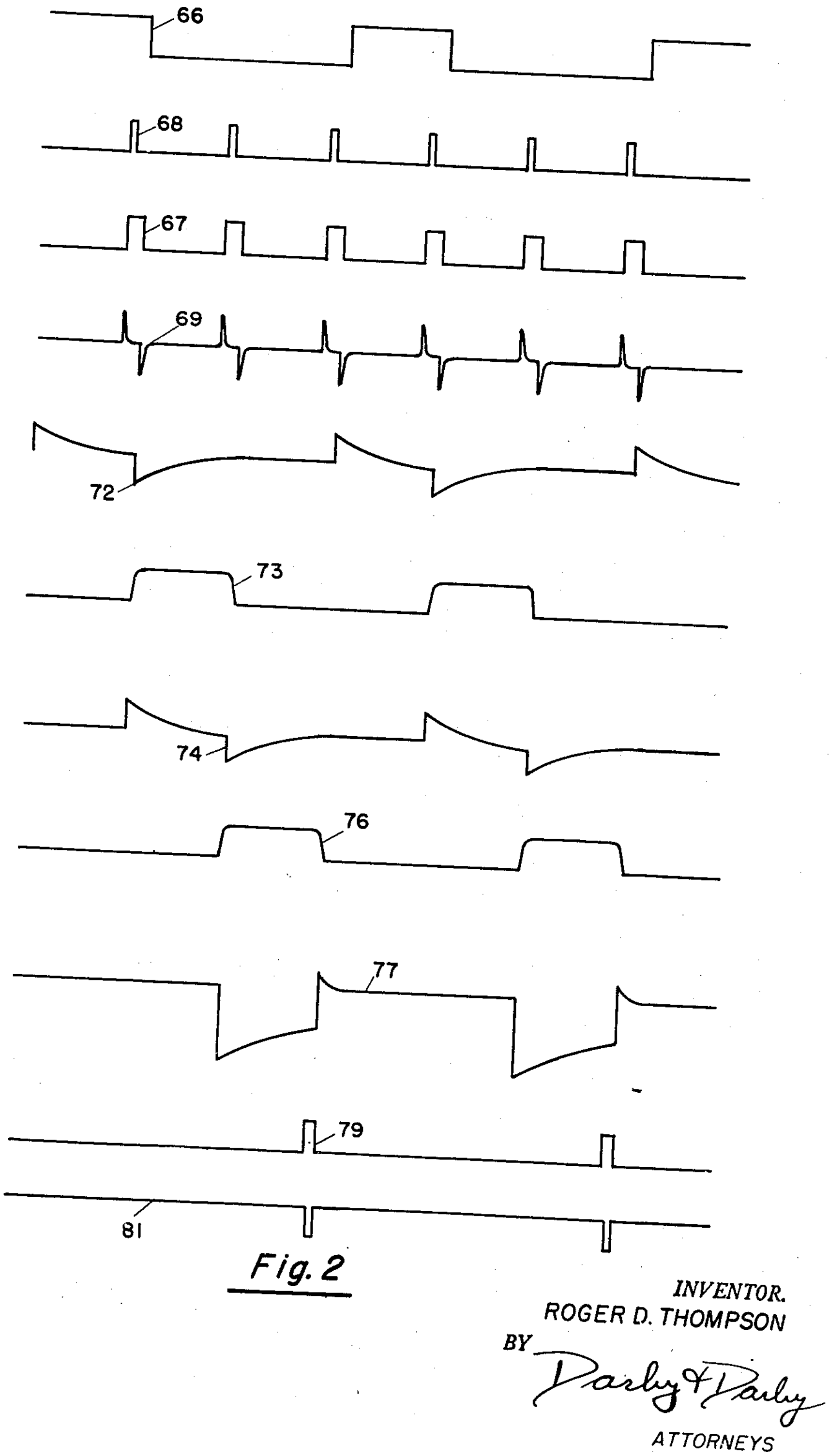

Further objects will be apparent after studying the following specifications together with the drawings in which, Figure 1 is a schematic representation of a switching circuit incorporating the invention; and Figure 2 shows wave forms illustrating the proper sequence of operation of the circuit in Figure 1.

The invention comprises a ring counter circuit consisting of three multivibrators connected in series, each being triggered in proper sequence by the previous one. A gating tube is interposed in the triggering connection between the third multivibrator and the first to insure proper phasing of the ring circuit with respect to color and field repetition rates. Other circuit refinements include a single clipping circuit in the second multivibrator to prevent undesired interaction between the first and third multivibrators, and integrating, or delay, circuits in the second and third multivibrators to insure proper sequence of operation.

The three sets of rectangular pulses provided by the multivibrators are applied to three amplitude control tubes to bring them into conduction sequentially. Each of the control tubes is provided with a biasing control to set the effective tube impedances, and all three of the tubes are connected in parallel as load impedances for a photoelectric pickup device.

The first multivibrator consists of tubes 11 and 12 interconnected in the usual way, with the control grid 13 of tube 11 coupled to the anode of tube 12 and the control grid 14 of tube 12 coupled to the anode of tube 11. In addition, tube 11 has a suppressor grid 16 which forms one synchronizing signal input terminal for the first multivibrator; and tube 12 has a suppressor grid 17 which forms a second input terminal for synchronizing voltages.

The anode of tube 11 is connected to the suppressor grid 18 of tube 19 in the second multivibrator consisting of tubes 19 and 21. A diode 22 is connected between the suppressor grid 18 and ground, and the tubes 19 and 21 are interconnected in the same way as tubes 11 and 12, with the anode of tube 19 coupled to the grid 23 of tube 21 and the anode of tube 21 coupled to the grid 24 of tube 19. The plate load 26 of tube 21 is shunted by a condenser 27, and the anode of tube 19 is coupled to the suppressor grid 28 of a tube 29.

Tube 29 and a companion tube 31 form the third multivibrator and are also interconnected in the same way as tubes 11 and 12, i. e., the anode of tube 31 is connected to the control grid 32 of tube 29 and the anode of tube 29 is connected to the control grid 33 of tube 31. A condenser 34 is connected in parallel with the plate load 36 of tube 31, and the control grid 32 is connected to the suppressor grid 37 of a tube 38.

The output circuit of a source 39 of positive color drive signals is connected to the control grid 41 of tube 38 and the anode of this latter tube is connected to the suppressor grid 16 of tube 11.

Three amplitude control tubes are connected to the three multivibrators to be turned on and off thereby. The control grid of tube 42 is connected to the control grid 14, the control grid of tube 43 is connected to the control grid 23, and the control grid of tube 44 is connected to the control grid 33. The cathode of tube 42 is grounded through a gain control potentiometer 46, the cathode of tube 43 is similarly grounded through a gain control potentiometer 47, and the cathode of tube 44 is grounded through a gain control potentiometer 48. The anodes of these three amplitude control tubes are connected in parallel with the photo-cathode 49 of a photo-multiplier tube 51.

The output circuit of a source 52 of negatively polarized, vertical drive signal voltage pulses is connected to the control grid 53 of a tube 54 which is interconnected with one section of a double triode 56 in a multivibrator formed by the coupling between the anode of tube 54 and the control grid 57 of tube 56 and further coupling between the anode 58 of tube 56 and the suppressor grid 59 of tube 54. The second section of tube 56 is connected as a diode between the suppressor grid 59 and ground to serve as an amplitude limiting device and a delay adjusting potentiometer 61 is included in the coupling circuit between anode 58 and grid 59. The anode of tube 54 is connected by means of a differentiating circuit 62, consisting of a condenser 63 and a resistor 64, to the three multivibrators by means of the suppressor grid 17 in tube 12 the suppressor grid 25 in tube 21 and the suppressor grid 35 in the tube 31.

Although the circuits described herein may operate with equal utility in other electrical systems, they are particularly adapted to the so-called field sequential color television system. The signals supplied by source 52 recur at the vertical repetition rate and may be vertical synchronizing signals or vertical drive signals or the like, whereas the signals supplied by source 39 recur at ⅓ the vertical repetition rate and are known as color synchronizing signals.

In describing the operation of the circuit it will be assumed that the first multivibrator has just been triggered into its active state i. e., tube 12 is conductive and tube 11 is nonconductive. Tube 42 is also conductive since it is controlled to operate simultaneously with tube 12. During the active state of the first multivibrator, the first positive peak of the wave 66 (shown in Figure 2) is generated at the plate of tube 11 and at the grid 14 of tube 12. Because of the sequential nature of the operation it follows that the second and third multivibrator must be in their quiescent condition in which tubes 19 and 29 are conductive while tubes 21 and 31 as well as tubes 43 and 44 are nonconductive.

In addition, tube 54 is conductive, while its companion tube 56 in the multivibrator circuit in which they are associated is non-conductive, as is tube 38. If all of these conditions are not fulfilled at the instant of putting the circuit into operation, the synchronizing circuits will, as shown hereinafter, insure that they are reached within the space of a few operating cycles of the ring circuit.

Near the end of the active period of the first multivibrator a pulse 67 from the source 52 is applied to the grid 53, halting current through the tube 54, which, in turn, initiates conduction in tube 56 by supplying a positive-going signal to grid 57. Shortly thereafter, at a time determined by the potentiometer 61, tube 54 resumes conduction, cutting off the current flow through the anode 58 in tube 56. This operation, repeated at the occurrence of each of the pulses 67, generates the pulses 68 at the anode of tube 54, as shown. The advantage of producing those new pulses 68 lies in the control which may be maintained over their duty cycle by means of control 61. In order to shape the pulses 68 for further use, they are applied to the differentiating circuit 62, from which they emerge as a series of differentiated pulses comprising negative pips 69. The differentiated pulses are applied to the grid 17 of tube 12, which since it is conductive is not affected by the positive pips but is biased beyond cutoff by the negative pips 69. The suppressor grids 25 and 35 are connected directly to grid 17 so that pips 69 render non-conductive whichever one of the corresponding tubes 21 or 31 is carrying current. Under normal operating conditions, conduction will be taking place in only one of the tubes 12, 21, or 31, at a time, stoppage of the current flow therethrough causes the multivibrator in which it is connected to revert to its quiescent condition. At the instant under consideration the reversion of the first multivibrator to its quiescent state terminates the positive portions of the pulses 66 and stops conduction through the tube 42.

The pulse 66 is applied to the suppressor grid 18 through a coupling circuit 15, the components of which are chosen to have a differentiating effect on the pulse 66, thereby producing a wave 71 in which the negative peak 72 has sufficient amplitude to trigger the second multivibrator by biasing the grid 18 beyond the cutoff point. Tube 21 is switched to the conductive state at the same time, and the second multivibrator starts to produce the positive, or active, portion of the wave 73 which renders tube 43 conductive.

At the end of a further period of time determined by the repetition rate of the synchronizing signals 68, tube 54 is again rendered non-conductive and a second one of the negative pips 69 is generated, stopping conduction in the tube 21 by forming a negative bias on the grid 25. The completed rectangular wave 73 is transmitted to the grid 28 in tube 29 and is differentiated, as was wave 66. The negative portion 74 of the differentiated wave halts conduction in tube 29 to trigger the third multivibrator into operation in the same way as the active state was initiated in the second multivibrator. Activation of the third multivibrator starts the active portion of the wave 76 which, in turn, places tube 44 in a conducting state.

At the occurrence of the proper one of the pulses 69 to terminate the positive portion of pulse 76, the grid 35 is biased so as to cut off the current flow in the tube 31 and return the third multivibrator to its quiescent state. Instead of obtaining the synchronizing signal for the succeeding multivibrator which, in this case, is the first multivibrator from the plate of tube 29 in a manner similar to that used in the first and second multivibrators, the wave 77 is obtained from the control grid 32 and applied to the suppressor grid 37 of tube 38. This latter wave is not differentiated as were waves 66 and 73.

The biasing of tube 38 is so arranged that grid 37 will allow conduction thereof only during the positive portion of the wave 77. During this time, a pulse 79 from the source 39 is applied to the control grid 41 of tube 38 to coact with wave 77 to place tube 38 in a conductive condition. The resultant output wave 81 is applied to the grid 16 of tube 11 to stop conduction therethrough and switch the first multivibrator into its active state. This completes one cycle of the ring circuit.

The advantage of the tube 38 connected in series with the three multivibrators in the ring circuit becomes apparent when it is realized that, even if the originally imposed conditions were not fulfilled, and if the second, instead of the first, multivibrator were initially in its active state, no synchronizing signals could feed through to the first multivibator until a pulse 79 allowed tube 38 to become conductive, and the ring counter circuit would simply mark time until pulse 79 occurred.

It will be noted that only a single diode 22 has been provided in the ring portion of the circuit. This diode is polarized so as to clip off the most positive peaks of the wave 71 such as occur at the beginning of the active time of the first multivibrator. If these positive portions were not clipped off by the diode, there would be a possibility of their being applied to the grid 18 during the portion when tube 19 was conductive and being amplified therein sufficiently to form negative pulses which could then be applied to the suppressor grid 28, causing tube 29 to become nonconductive. Hence, tubes 11 and 29 would be triggered at the same time and tubes 42 and 44 would become conductive simultaneously. Due to the momentary conduction of tube 38, there is no possibility of similar feed-through from the second multivibrator to the first or from the third multivibrator to the second. Hence a single clipping diode 22 is sufficient.

The effect of the condensers 27 and 34 is to serve as delay means to slow down the operation of the second and third multivibrators in order to insure that no overlap occurs during which two or more of the amplitude control tubes 42—44 would be simultaneously conductive. The slowing down effect is exhibited as an increase of the rise and delay times of pulses 73 and 76 as shown in the wave form drawing in Figure 2. It is unnecessary to provide such a retarded action in the first multivibrator due to the synchronizing sequence in which pulses 79 are timed to occur after the start of the positive portion of wave 77. Consequently, no condenser has been provided across the plate load of tube 12.

Amplitude control tube 42 functions during the active portion of the wave 66 as a variable anode load impedance for the photo tube 51. Tube 43 functions similarly during the active portion of wave 73 and tube 44 functions during the active portion of wave 76.

The necessity of preventing overlap between the above-mentioned active portions has been stressed; in addition, it is essential that the effective load impedance presented by tubes 42—44 be controlled only by the corresponding bias control resistors 46—48 and not by the wave shape of the voltage pulses applied to the control grids. For this reason, the control grids of tubes 42—44 are connected directly to the control grids of the second tubes in the three corresponding multivibrators. The voltage on these grids is either zero (during the active periods of the multivibrators) or far below cutoff bias so that tubes 42—44 are either conductive to the limit imposed by resistors 46—48, or they are non-conductive.

The switch circuit described hereinabove is illustrated as part of a field sequential color television mixing circuit in a flying spot scanner, but its utility is not limited to the single application shown. Some type of mixing circuit is usually incorporated in every color television system to correct the unequal overall color response by providing an unequal system gain for the three signals corresponding to the three primary colors. In sequential color systems, the three signals may be applied to three separate gain-controlled amplifiers and the output signal selected sequentially from each of the amplifiers in turn by means of a switch circuit such as has been described hereinabove, or the gain (or attenuation) of some element in the composite signal path may be varied in an ordered sequence by a switch circuit. The latter method is followed in the present case.

The element to be operated on is the photosensitive pick-up device 51, at least one of which is found in every television system. Since the system under consideration is a flying spot scanner, device 51 is a photomultiplier tube, such as the 931-A, which is shown illustratively in Figure 1 with only a few of the normal number of diodes. The paralleled plate circuits of the control tubes 42—44 are connected to the photocathode 49 of tube 51, and the overall gain of the pick-up tube is controlled by the instantaneous impedance of the tubes 42—44. It is essential, as has already been stated, that only one of the amplitude control tubes 42—44 be conductive at a time.

Furthermore, due to the inherent capacity, indicated by the reference character 84, coupling the photocathode 49 to the output anode 86, any sharp voltage impulses that existed at cathode 49 would be impressed on the video signal at anode 86. In order to suppress any such impulses, a condenser 87 is connected between cathode 49 and ground.

Although this invention has been described in relation to a particular circuit arrangement, it is not to be considered limited thereby but only by the following claims.

What is claimed is:

1. A switching arrangement comprising a first source of synchronizing signals having a predetermined repetition rate; a second source of synchronizing signals having a repetition rate equal to an integral multiple of the repetition rate of said first-named synchronizing signals; and a plurality of pulse generating circuits equal in number to said integral multiple, each of said circuits being connected to one other of said circuits partially to control the operation thereof, said second source being connected to each of said circuits further to control the operation thereof; a gating circuit included in the connection between a first and a second one of said pulse generating circuits, said first source being connected to said gating circuit to control the operation thereof.

2. A switching arrangement comprising a first source of synchronizing signals having a predetermined repetition rate; a second source of synchronizing signals having a repetition rate equal to three times the repetition rate of said first-named synchronizing signals; and three pulse generating circuits, each of said circuits being connected to another of said circuits partially to control the operation thereof, said second source being connected to each of said circuits further to control the operation thereof; a gating circuit included in the connection between a first and a second one of said generators, said first source being connected to said gating circuit to control the operation thereof to allow said second one of said generators to control the first one of said generators; and a limiting circuit in the connection between said first generator and a third one of said pulse generating circuits.

3. A switching circuit comprising a first source of synchronizing signals having a predetermined repetition rate; a second source of synochronizing signals having repetition rate equal to an integral multiple of the repetition rate of said first synchronizing signals; a plurality of pulse generating circuits equal in number to said integral multiple; a connection between each of said circuits to control partially the operation of said other circuit; a connection between said second source and each of said circuits further to control the operation thereof, the connection between a first and a second one of said circuits including a gating circuit; and a connection between said first source and said gating circuit to control the operation thereof, said connection comprising a smoothing circuit.

4. A switching circuit comprising a first source of synchronizing signals having a predominating repetition rate; a second source of synchronizing signals having repetition rate three times as high as the repetition rate of said first-named synchronizing signals; three pulse generating circuits; a connection between a first one of said circuits and a second one of said circuits; a second connection between said first one of said circuits and a third one of said circuits; a connection between said third one of said circuits and said first one of said circuits, said third connection including a gating circuit; a connection between said first source and said gating circuit to control the operation thereof; a connection between said second source and each of said pulse generating circuits partially to control the operation thereof; a smoothing circuit comprising said second connection; an amplitude limiting circuit comprising said first connection; said third connection comprising a smoothing circuit.

References Cited in the file of this patent

UNITED STATES PATENTS

| Number | Name | Date |
|---|---|---|
| 2,552,968 | Hochwald ---------- | May 15, 1951 |